Sept. 11, 1945.  R. W. SILER  2,384,497
SLING FITTING
Filed Sept. 28, 1944  3 Sheets-Sheet 1
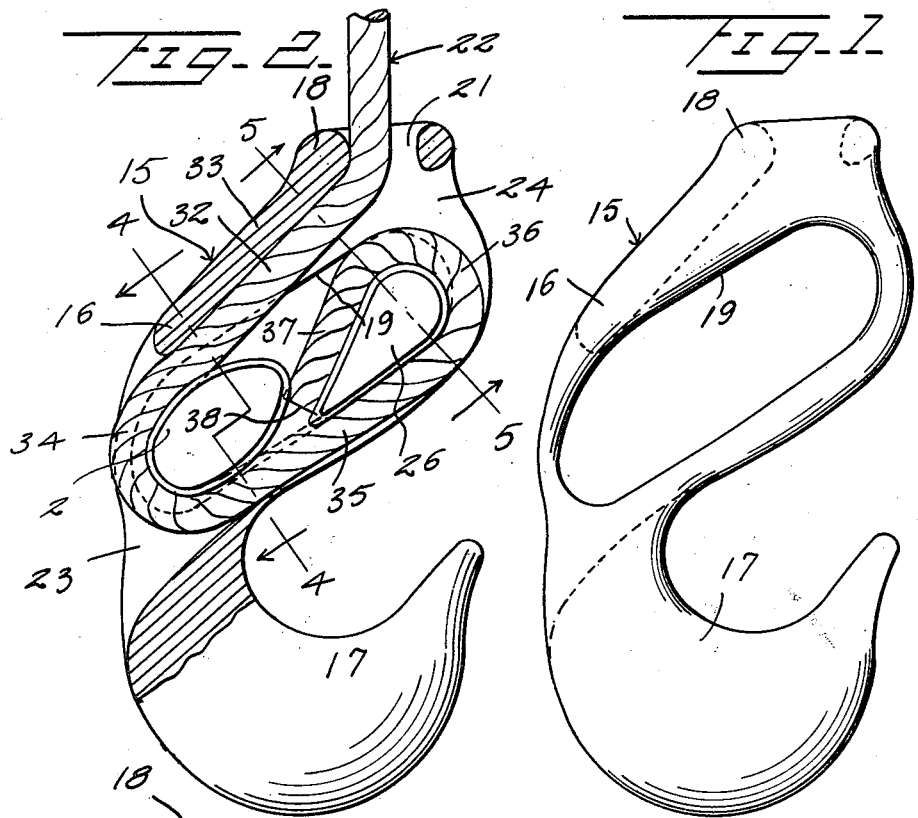
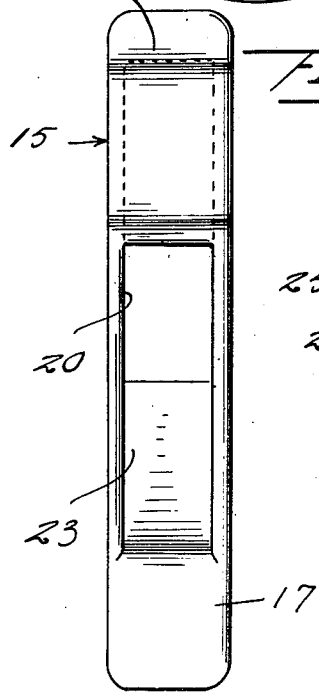
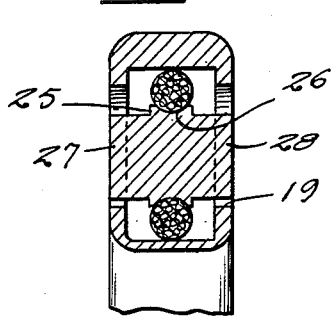
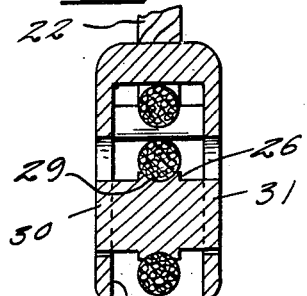
Inventor
R. W. Siler
By Kimmel & Crowell
Attorneys

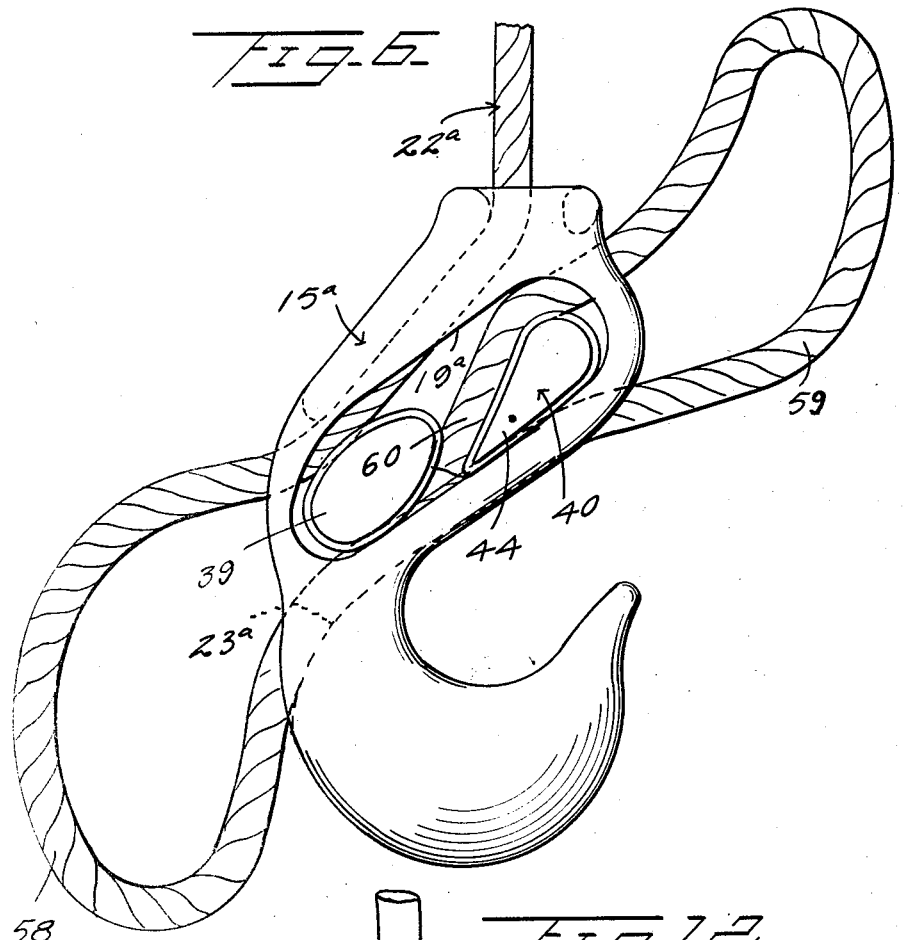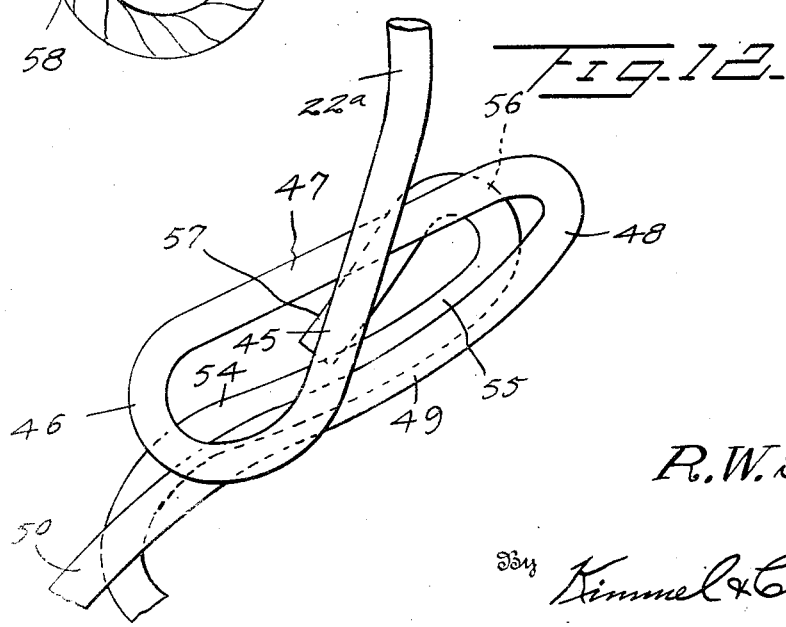

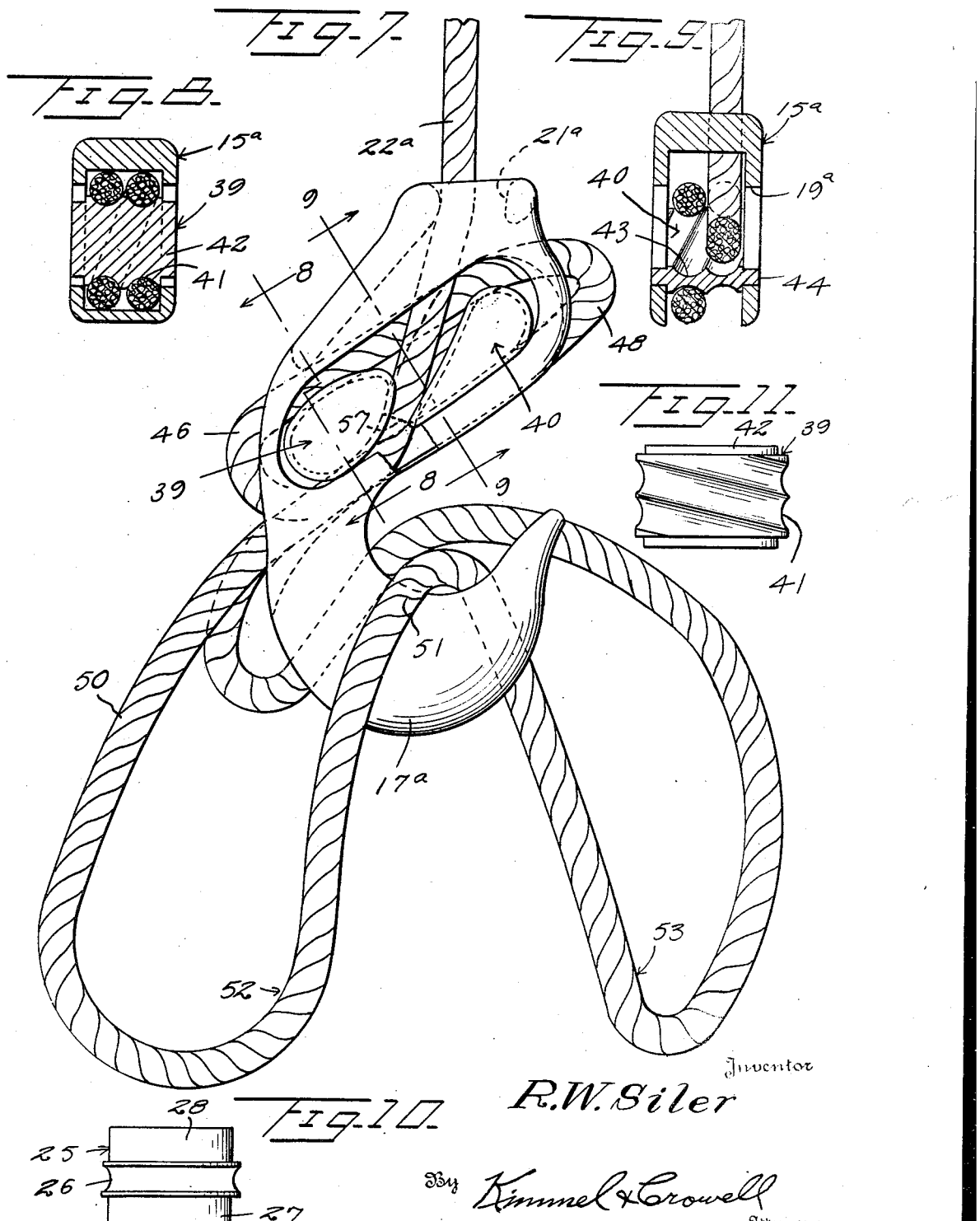

Patented Sept. 11, 1945

2,384,497

UNITED STATES PATENT OFFICE 2,384,497

SLING FITTING

Robert W. Siler, Oak Ridge, Tenn.

Application September 28, 1944, Serial No. 556,213

5 Claims. (Cl. 294—74)

This invention relates to sling fittings or hooks, and is an improvement over the construction embodied in my prior Patent No. 2,130,040, dated September 13, 1938.

An object of this invention is to provide a hook or fitting which can be coupled to either an end of a flexible line or at a selected point between the ends of the line. Where the hook is coupled to the line at a point between the ends thereof, a loop or sling may be formed which may be extended over the hook or wrapped about the article, and pulling force from one or opposite directions effecting a tighter gripping of the line with respect to the hook.

Another object of this invention is to provide an improved hook embodying a shank having an elongated opening in which a pair of line clamping or gripping wedges are adapted to be positioned, the opening being of such size that the wedges may be inserted either before or after the line has been looped within the shank opening.

A further object of this invention is to provide an improved hook which is formed with an elongated transverse opening in the shank thereof for receiving line locking wedges, and a line passage opening through the upper end of the shank and also through the rear thereof, so that if desired the hook may be locked to the line at a point between the ends of the line and the extended end of the line may be returned to the shank and locked in the opening, thereby forming a cradle or sling.

In the drawings:

Figure 1 is a detail side elevation of a hook constructed according to an embodiment of this invention.

Figure 2 is a detail side elevation partly broken away and in section, showing one manner of securing a flexible line to the hook.

Figure 3 is a detail rear elevation of the hook.

Figure 4 is a fragmentary sectional view taken on the line 4—4 of Figure 2.

Figure 5 is a sectional view taken on the line 5—5 of Figure 2.

Figure 6 is a detail side elevation of a modified form of this hook and line locking means.

Figure 7 is a detail side elevation of the hook, showing the manner in which a line may be secured to the hook to form a sling or cradle.

Figure 8 is a sectional view taken on the line 8—8 of Figure 7.

Figure 9 is a sectional view taken on the line 9—9 of Figure 7.

Figure 10 is a plan view of one of the wedges used with this hook.

Figure 11 is a plan view of another wedge used with this hook.

Figure 12 is a diagrammatic view showing the manner of looping the line to form a sling.

Referring to the drawings, the numeral 15 designates generally a hook which is formed of a shank 16 and a bill 17. The shank 16 is provided with a forwardly offset upper end portion 18 overlying the bill 16 and the shank 18 is also formed with a transverse elongated opening 19 which extends at an obtuse angle to the length of the shank 18. The shank 18 is also provided with a longitudinal slot 20 communicating with an opening 21 formed in the upper end of the shank and through which a flexible line 22 is adapted to be extended. The slot 20 opens through the forward side or edge of the hook 15 and also opens as at 23 through the rear side of the hook. The slot 20 also opens, as indicated at 24, through the forward side of the shank 15 and through the lower portion of the shank which overlies the bill 17.

In order to provide a means whereby the line 22 may be locked to the hook 15, I have provided a pair of wedges 25 and 26. Wedges 25 and 26 are of ovoidal configuration and when in operative position are adapted to have their small ends innermost or in confronting relation, as shown in Figure 2. The wedge 25 is formed with a groove or channel 26 within which the line is adapted to seat, and is also formed with a pair of laterally extending flanges 27 and 28 which terminate at substantially the outer sides of the shank and loosely engage within the elongated opening 19. Wedge 26 is also formed with a line receiving groove 29 and is provided with lateral extensions 30 and 31 which engage within the opening 19, so as to prevent vertical movement of wedge 26 when a pulling force is applied to the line.

In Figure 2 the line 22 is shown extended downwardly through upper opening 21 and is then continued downwardly as indicated at 32, the line portion 32 bearing against the adjacent wall 33 of the slot 20. The line 22 is then extended as at 34 about the large end of wedge 25 and is further extended as at 35 along the lower portion of wedge 26. Line 22 is then looped, as indicated at 36, about the large end of wedge 26 and extended downwardly and rearwardly as at 37. The terminal end 38 of the line 22 is adapted to be positioned between the adjacent small ends of wedges 25 and 26, so that when a pulling force is applied to line 22, wedge 25 will be moved inwardly and upwardly so that the small end of wedge 25 will press against the terminal end 38 of the line and clamp this end of the line against the upper side of wedge 26. The pulling force applied to line 22 will also apply a downwardly and rearwardly pressure force on line portion 35, tending to pull wedge 26 in the direction of wedge 25.

Referring now to Figures 6 to 12, inclusive, there is disclosed a modified form of a combined hook and wedge structure which is adapted to be used for forming a sling or cradle and for coupling the hook to the line at a point between the ends of the line.

The hook 15a is identical in every respect to hook 15, and hook 15a has associated therewith a pair of compound wedges 39 and 40. The wedges 39 and 40 have a configuration in side elevation which is substantially ovoidal and each of these wedges, as shown in Figure 11, is formed with a spiral or compound groove 41 for receiving the flexible line 22a. Wedge 39 is provided with oppositely extending lateral extensions 42 which are adapted to engage within transverse elongated opening 19a. Wedge 40 is also formed with a spiral groove 43 and is constructed with lateral extensions 44 loosely engaging within transverse opening 19a.

In the use of the hook structure shown in Figures 6 to 9, inclusive, the line 22a is extended downwardly through opening 21a formed in the upper end of the shank is then extended downwardly, as indicated at 45, beneath the inner portion of wedge 39. Line 22a is then looped, as indicated at 46, about the large end of wedge 39 and extended forwardly along the upper portion of opening 19a, as indicated at 47. Line 22a is then looped back, as indicated at 48, over the large end of wedge 40 and passed beneath wedge 40, as indicated at 49. Line 22a is then extended, as indicated at 50, through the rear opening 23a in the shank of the hook, and extension 50 may be of any desired length so as to form an elongated loop of desired size, which may be engaged as a single loop about the article, or, if desired, a double loop may be formed, as shown in Figure 7, by bringing a portion of extension 50, as indicated at 51, over the bill 17a of the hook. In this manner two loops 52 and 53 will be provided which may be engaged about the article and one side of loop 53, which includes the free end of line 22a, is then extended upwardly into rear opening 23a, and passed beneath wedge 39, as indicated at 54. The line is then extended upwardly and forwardly, as indicated at 55, beneath wedge 40 and then looped about the large end of wedge 40, as indicated at 56, with the looped portion 56 disposed in side by side relation with respect to the looped portion 48. The terminal end portion 57 is then extended downwardly and rearwardly over the top of wedge 40 and positioned between the small overlapping ends of wedges 39 and 40. In this manner an upward pull on line 22a will draw wedge 39 toward wedge 40 and a downward pull on extension 54 will cause a downward and rearward pull on loop 56, and thereby tend to pull wedge 40 toward wedge 39. The downward pull of wedge 40 and the upward pull on wedge 39 will cause a clamping or gripping action to take place, which will grip the end 57 of the line between the two wedges 39 and 40.

It will be understood that while this hook or fitting has been disclosed as used in one instance at the end of the flexible line and in another instance as used to form a loop or cradle with the hook locked to the line at an intermediate point on the latter, it will be apparent that various other ways of connecting the hook to the line may be provided with the wedges hereinbefore described. I, therefore, do not wish to be limited to the specific loops herein described, as both single and multiple loops may be formed.

As another example, in Figure 6 there are disclosed two loops 58 and 59 extending from the rear and forward side of the shank 15a with the terminal end 60 of the line interposed between the small ends of wedges 39 and 40. The construction shown in Figure 6 indicates the initial arrangement of the line 22a, and it will be understood that loop 58 will subsequently be pulled up tight against the large end of wedge 39 and loop 59 will be pulled up tight against wedge 40.

What I claim is:

1. A fitting as set forth comprising a hook formed with a shank and a bill, said shank having an elongated opening transversely therethrough and inclined to the length thereof, said shank also being formed with a slot communicating with said opening and opening through the rear side of said shank, said shank also having an opening through the upper end thereof and communicating with said slot, and a pair of oppositely disposed line clamping wedge members engageable in said slot.

2. A fitting as set forth in claim 1 wherein said wedge members include laterally projecting supporting means loosely engaging in said elongated opening.

3. A fitting as set forth in claim 1 wherein said wedge members are of substantially ovoidal configuration in side elevation.

4. A fitting as set forth in claim 1 wherein each wedge member is formed with a line receiving groove.

5. In combination a hook formed with a shank and a bill, said shank having an elongated opening transversely therethrough and a passage opening through the upper end of said shank and the rear side thereof, a pair of wedge members disposed in said opening and having their small ends innermost and in overlapping relation, and a flexible line extended into said passage from the upper end of said shank, said line being extended about the outer end portions of said wedge members and having the terminal end thereof disposed between the overlapping inner ends of said wedge members whereby downward pull on the bill of said hook will effect a tight clamping force being exerted on said terminal end.

ROBERT W. SILER.